United States Patent [19]

Sugifune et al.

[11] Patent Number: 5,087,879
[45] Date of Patent: Feb. 11, 1992

[54] CONSTRUCTION FOR ADJUSTABLY MOUNTING SENSOR PORTION OF MAGNETIC ROTATION SENSOR AND METHOD OF ADJUSTING GAP BETWEEN SENSOR AND ROTATING DRUM

[75] Inventors: Shin Sugifune, Sendai; Hiraku Abe, Iwadeyama, both of Japan

[73] Assignee: Alps Electric Co., Ltd., Tokyo, Japan

[21] Appl. No.: 585,337

[22] Filed: Sep. 19, 1990

[30] Foreign Application Priority Data

Dec. 8, 1989 [JP] Japan .................................. 1-317649

[51] Int. Cl.$^5$ ...................... G01B 7/14; H02H 15/00
[52] U.S. Cl. .......................... 324/207.25; 324/207.11; 324/207.12; 324/202; 29/595
[58] Field of Search .................. 324/173, 174, 207.11, 324/207.12, 207.13, 207.14, 207.25, 202, 262; 29/592.1, 595, 596

[56] References Cited

U.S. PATENT DOCUMENTS 3,513,469 5/1970 Christenson et al. ............... 324/173
4,259,603 3/1981 Uchiyama et al. .................. 324/174
4,694,688 9/1987 Takahashi et al. .

Primary Examiner—Walter E. Snow
Attorney, Agent, or Firm—Guy W. Shoup; David W. Heid

[57] ABSTRACT

A magnetic rotation sensor is disclosed, in which by raising the precision of the size between a first hole for positioning a magnetic rotation drum and second holes for positioning pin guides and at the same time by keeping the outer diameter of the pin guides at a high precision, the gap between the drum described above and a sensor supported by the pin guides can be kept precisely almost without any adjustment.

2 Claims, 4 Drawing Sheets

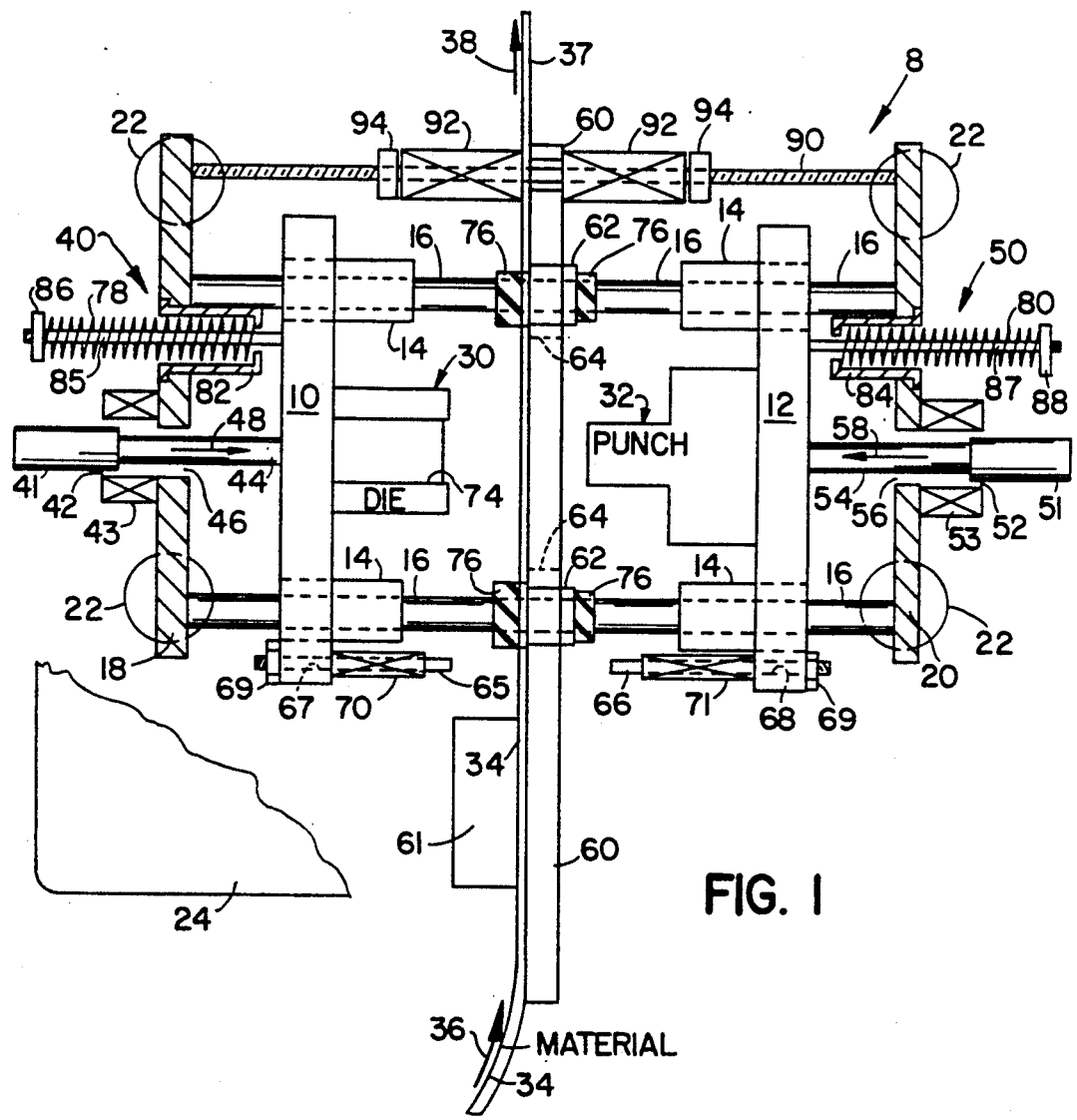
FIG. I

CONSTRUCTION FOR ADJUSTABLY MOUNTING SENSOR PORTION OF MAGNETIC ROTATION SENSOR AND METHOD OF ADJUSTING GAP BETWEEN SENSOR AND ROTATING DRUM

FIELD OF THE INVENTION

The present invention relates to a magnetic rotation sensor and a method for fabricating same.

BACKGROUND OF THE INVENTION

FIGS. 4 to 6 are schemes for explaining a prior art example, in which FIG. 4 is a cross sectional side view showing schematically a magnetic rotation sensor; FIG. 5 is a graph showing a characteristic curve indicating the relation between the gap between an MR sensor and a magnetic rotating drum and the sensor output; and FIG. 6 is an exploded perspective view of the principal part showing the gap adjusting mechanism.

In the figures, reference numeral 1 is a shaft mounted on a housing 2, perpendicularly thereto and the magnetic rotating drum 3 is supported by the shaft/rotatably and positioned. 4 is a guide, which is molded, consisting of a bottom plane 4a and a vertical plane 4b. On the lower surface of the bottom plane 4a there are disposed mounting portions 5 having a small diameter. The mounting portions 5 are movable in slits 6 formed in the housing 2, extending towards the magnetic rotating drum 2. 7 is the MR sensor mounted on the vertical plane 4b of the guide 4 described above, which detects the rotational direction and the rotating speed of the magnetic rotating drum 3 and which is so constructed that the output thereof is led out to the exterior through a wiring film F. Further 9 is a hole for positioning the magnetic rotating drum 3.

The gap G between the MR sensor 7 and the magnetic rotating drum 3 is determined by the diameter of the magnetic rotating drum 3, the thickness of the MR sensor 7, the position of the guide 4, etc. and fluctuations in the precision of the gap G are determined by fluctuation of a plurality of elements as described above, combined with each other.

If the fluctuations in the gap G described above are in a tolerance region A as indicated in FIG. 5, the sensor 7 can obtain an output higher than a required value B. On the contrary, in the case where they are not in the tolerance region A, it is not possible to obtain any required sensor output.

In this case, adjustment was effected by moving the mounting portions 5 of the guide 4 in the slits 6.

However, since the slits are set previously so as to have a clearance between the mounting portions 5 of the guide and the periphery thereof, the guide 4 can be slightly inclined at securing it by means of nuts 8. Therefore the adjustment was difficult for this reason and others.

OBJECT OF THE INVENTION

The present invention has been done in order to solve the problem of the prior art technique as described above and the object thereof is to provide a magnetic rotation sensor, for which it is easier to adjust the gap between the magnetic rotating drum and the MR sensor than for a prior art sensor and a method for fabricating same.

SUMMARY OF THE INVENTION

In order to achieve the above object, a magnetic rotation sensor according to a first of the present inventions is characterized in that it comprises a magnetic rotating drum positioned through a first positioning hole formed in a housing; pin guides inserted in positioning second holes formed in the housing; and an MR sensor supported by these pin guides and located so as to be opposite to the magnetic rotating drum; wherein the interval between the first hole and the second holes is set previously at a predetermined value, taking it into account to form a gap having a predetermined size between the magnetic rotating drum and the MR sensor. By a method for fabricating the magnetic rotation sensor, which is a second of the present inventions, comprising a magnetic rotating drum positioned through a first positioning hole formed in a housing; pin guides inserted in positioning second holes formed in the housing; and an MR sensor supported by these pin guides and located so as to be opposite to the magnetic rotating drum; wherein the interval between the first hole and the second holes is set previously at a predetermined value, taking it into account to form a gap having a predetermined size between the magnetic rotating drum and the MR sensor, the predetermined gap between the magnetic rotating drum and the MR sensor is obtained by preparing previously a plurality of pin guides having different diameters and by exchanging selectively these pin guides.

Since the magnetic rotation sensor according to the first invention has a construction as described above and the first hole for positioning the magnetic rotating drum as well as the second holes for positioning the pin guides are formed in the housing by punching, the diameters of the holes and the size between the two sorts of holes can be set with a high precision. Further, since the diameter of the pin guide can be kept at a high precision by cutting, no adjustment of the gap between the magnetic rotating drum and the MR sensor is necessary for almost all products. However, even in the case where the adjustment of the gap is necessary because of fluctuations in the diameter of the magnetic rotating drum, the thickness of the MR sensor, etc., the adjustment can be effected easily by exchanging the pin guides having a different diameter.

Further, by the method for fabricating same according to the second invention, since the adjustment of the gap is effected by preparing previously pin guides having different diameters and inserting selectively one of them in each of second holes formed in the housing, the adjustment of the gap is simpler than by the prior art method.

BRIEF DESCRIPTION OF THE DRAWINGS

FIGS. 4 to 6 are schemes for explaining a prior art example; FIG. 4 being a cross sectional side view of a magnetic rotation sensor, FIG. 5 showing a characteristic curve indicating the relation between the gap between the MR sensor and the magnetic rotating drum and the sensor output; FIG. 6 being an exploded perspective view of the principal part of the gap adjusting mechanism.

DETAILED DESCRIPTION

Hereinbelow an embodiment of the present invention will be explained, referring to the attached drawings.

Figure 1:
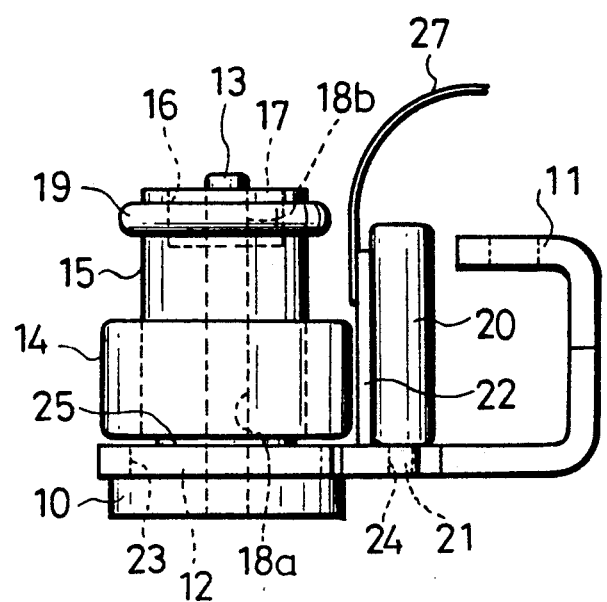
FIGS. 1 to 3 are schemes for explaining an embodiment of the present invention, FIG. 1 being a side view of a magnetic rotation sensor, FIG. 2 being a top view thereof FIG. 3 being an exploded perspective view thereof.
Figure 2:
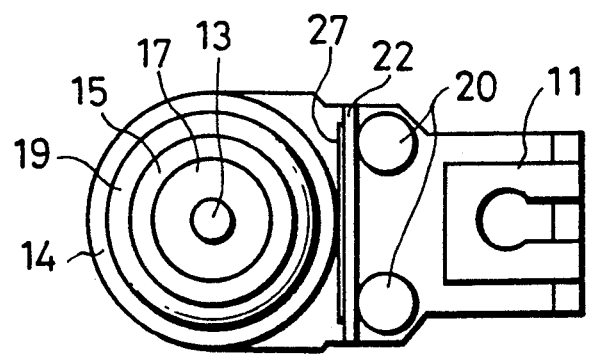
Figure 3:
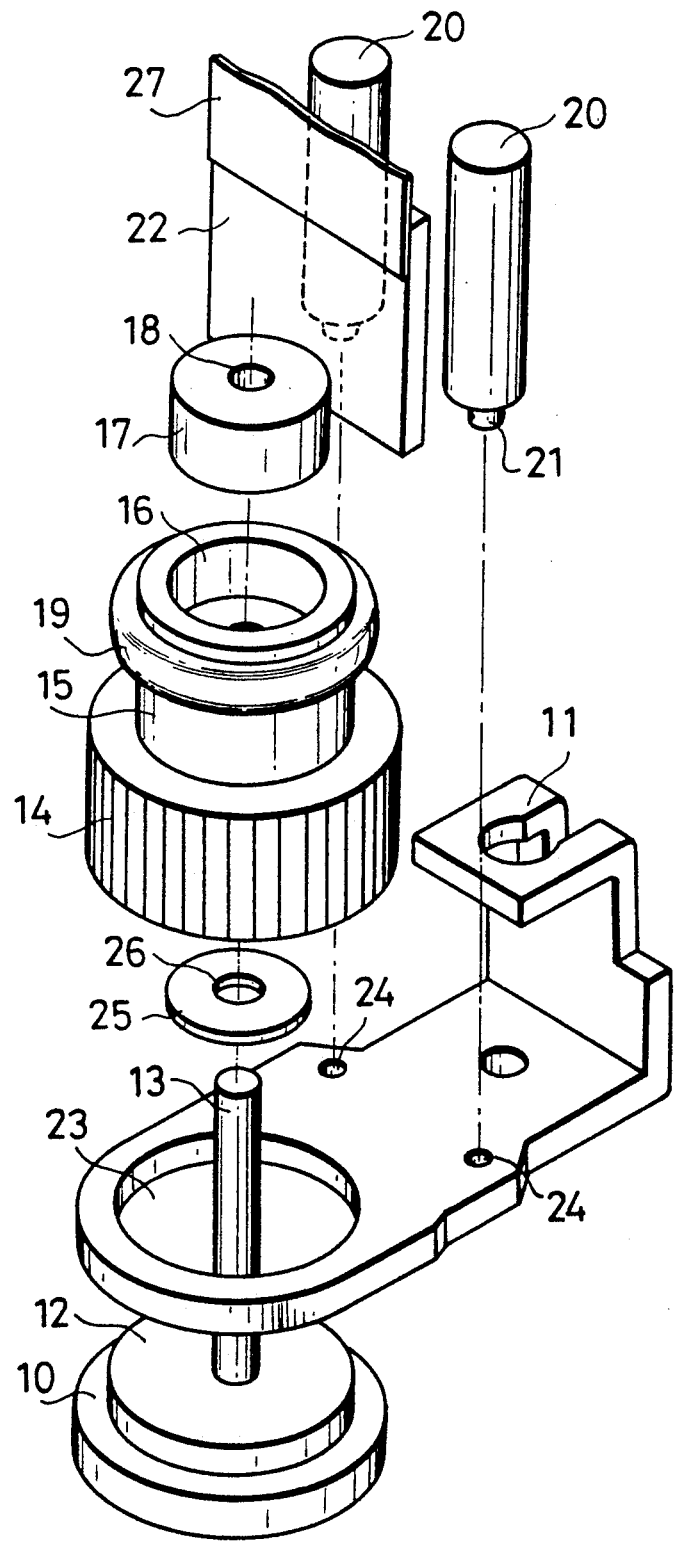
Figure 4:
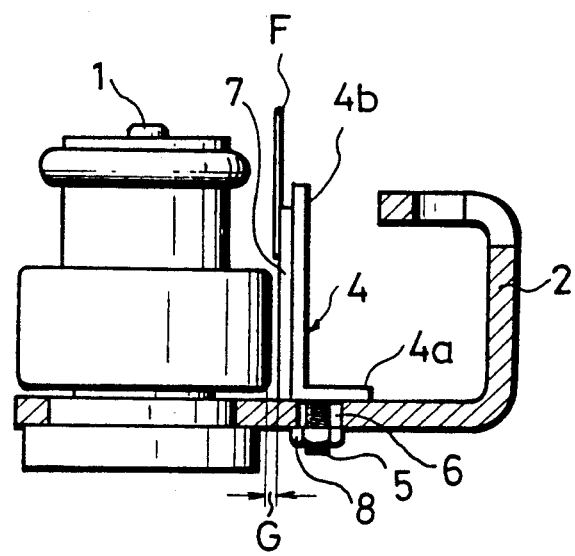
Figure 5:
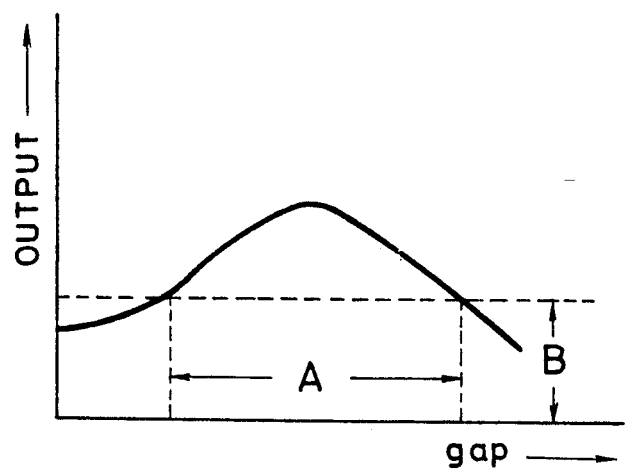

FIGS. 1 to 3 are schemes for explaining the embodiment of the present invention, FIG. 1 being a side view of the magnetic rotation sensor, FIG. 2 being a top view thereof, FIG. 3 being an exploded perspective view thereof.

In the figures, reference numeral 10 is a stopper, at the center of which a flange portion 12 having a same thickness as a housing 11 is disposed. A shaft 13 is engaged with the flange portion 12 at the center thereof, perpendicularly thereto. 14 is a magnetic rotating drum, in which a metallic flange portion 15 is thrustin with pressure. A cylindrical bearing 17 is thrust in a recess portion 16 formed in the upper surface of the flange portion 15. Shaft insertion holes 18a and 18b are formed so as to pass through the flange portion 15 and the bearing 17, in which the shaft 13 described above is inserted freely rotatably. 19 is a roller, in which the flange portion 15 is inserted, giving the magnetic rotating drum 14 rotating force, engaged with another member omitted in the figures. 20 shows cylindrical pin guides, at the lower end of each of which a mounting portion 21 having a small diameter is disposed. 22 is an MR sensor adhered to the pin guides 20 with UV adhesive agent, etc. and 27 is a wiring film wired to the MR sensor.

Further a first hole 23, in which the flange portion 12 of the stopper 10 is inserted, and second holes 24, in each of which the mounting portion 21 of the pin guide is inserted, and which are distant from the first hole 23 by a predetermined distance, are formed in the housing 11.

Furthermore 25 is a ring-shaped slider having a hole 26 at the center, which has a same diameter as the shaft insertion holes 18a and 18b. 27 is the wiring film connected with the MR sensor.

Now an example of the method of mounting the magnetic rotation sensor will be explained, referring to FIG. 3.

At first, the mounting portion 21 of each of the pin guides 20 is inserted in each of the second holes 24 formed in the housing 11 so as to be engaged therewith. Next, the flange portion 12 of the stopper 10 is inserted in the first hole 23 from the bottom of the housing 11 so as to be engaged therewith and the shaft 13 is made pass through the first hole 23, the hole 18a formed in the flange portion 25 and the hole 18b formed in the bearing 17 so as to protrude upward therefrom and the magnetic rotating drum 14 is positioned in the first hole 23 through the slider 25. Then the bearing 17 is inserted in the roller so as to be engaged therewith. In this state the MR sensor 22 is brought into contact with the pin guides 20 and the output characteristics are verified. If satisfactory characteristics are obtained, the parts are fixed together e.g. with an UV adhesive agent and thus the mounting is finished.

According to the structure described above, since the first hole 23 and the second holes 24 formed in the housing 11 are set previously at predetermined positions by press, taking it into account to form the gap having a predetermined size between the magnetic rotation drum 14 and the MR sensor 22, and the pin guides 20 are formed by cutting the outer diameter thereof, which is a working method of high precision, in the case where the whole product is mounted by combining the magnetic rotating drum 14 positioned through the first hole 23 with the pin guides 20 positioned by the second holes 24, the gap G between the magnetic rotating drum 14 and the MR sensor 22 can be correctly set.

Consequently, although no adjustment of the gap G is required for most of products, even in the case where adjustment of the gap G is required at the worst because of fluctuations in the diameter of the magnetic rotating drum 14, the thickness of the MR sensor, etc., the adjustment can be effected easily by replacing the pin guide by another having a different diameter, which is inserted in the second hole 24 to engage it therewith.

Further, by the fabrication method according to the second invention, since the adjustment of the gap G can be effected only by preparing a plurality of pin guides 20 having different diameters and by inserting selectively the mounting portion 21 of one of them in each of the second holes 24 formed in the housing 11, the adjustment of the gap G is simpler than by the prior art method.

According to the present inventions, by raising the precision in the size of the first hole for positioning the magnetic rotating drum and the second holes for positioning the pin guides and at the same time by keeping the outer diameter of the pin guides with a high precision, it is possible to keep precisely the gap between the magnetic rotating drum positioned through the first hole and the MR sensor supported by the pin guides almost without any adjustment thereof. Even in the case where the adjustment of the gap is required at the worst because of fluctuations in the diameter of the magnetic rotating drum, the thickness of the sensor, etc., the adjustment can be effected easily by exchanging pin guides having different diameters prepared previously, which are inserted in the second holes formed in the housing to engage them therewith.

What is claimed is:

1. A magnetic rotation sensor comprising:
   a housing including a planar surface having a first positioning hole and a plurality of second positioning holes disposed adjacent said first positioning hole;
   a magnetic rotating drum positioned through said first positioning hole formed in said housing;
   pin guides comprising two cylindrical portions, first cylindrical portions having a first diameter inserted in said second positioning holes formed in said housing and second cylindrical portions having a second diameter; and
   an MR sensor supported by said second cylindrical portions of said guide pins and located so as to be opposite to a perimeter of said magnetic rotating drum;
   wherein the interval between said first hole and said second holes is set to form a gap having a predetermined size between said magnetic rotating drum and said magnetic sensor;
   wherein said second diameter of said second cylindrical portions is selectively adjustable to adjust said gap.

2. A method for fabricating a magnetic rotation sensor comprising:
   positioning a magnetic rotating drum through a first positioning hole formed in a housing;
   inserting a plurality of pin guides each pin guide having first and second portions with different diameters in second positioning holes formed in said housing;

positioning an MR sensor with said first portions of said pin guides so as to locate said sensor at a perimeter of said magnetic rotating drum;

selectively adjusting a gap between said magnetic rotating drum and said sensor by substituting new pin guides having first portions of a different diameter.

* * * * *